United States Patent
Corrao et al.

(10) Patent No.: US 7,301,913 B2
(45) Date of Patent: Nov. 27, 2007

(54) TRANSCODING ARRANGEMENT IN A SESSION INITIATION

(75) Inventors: Angelo Corrao, Palermo (IT); Robert Sugar, Budapest (HU); Markus Isomäki, Espoo (FI)

(73) Assignee: Nokia Corporation, Espoo (FI)

( * ) Notice: Subject to any disclaimer, the term of this patent is extended or adjusted under 35 U.S.C. 154(b) by 652 days.

(21) Appl. No.: 10/490,439

(22) PCT Filed: Oct. 9, 2002

(86) PCT No.: PCT/FI02/00791

§ 371 (c)(1),
(2), (4) Date: Mar. 24, 2004

(87) PCT Pub. No.: WO03/032585

PCT Pub. Date: Apr. 17, 2003

(65) Prior Publication Data

US 2004/0240399 A1 Dec. 2, 2004

(30) Foreign Application Priority Data

Oct. 9, 2001 (FI) ................................. 20011962

(51) Int. Cl.
*H04L 12/50* (2006.01)
*H04L 12/16* (2006.01)
*H04Q 11/00* (2006.01)

(52) U.S. Cl. ...................... 370/260; 370/261; 370/265; 370/359

(58) Field of Classification Search ........ 370/352–360, 370/260, 328, 261, 265; 709/204, 226–227; 707/100
See application file for complete search history.

(56) References Cited

U.S. PATENT DOCUMENTS 6,788,676 B2* 9/2004 Partanen et al. ............ 370/352

(Continued)

FOREIGN PATENT DOCUMENTS

EP     1 079 573 A2    2/2001

(Continued)

OTHER PUBLICATIONS

ETSI TS 124 229 V5.1.0 (Jun. 2002) Digital Cellular telecommunications System (Phase 2+), Umiversal Mobile Telecommunications System (UMTS): IP Multimedia Call Control Protocol based on SIP and SDP; Stage 3 (3GPP TS 24.229 version 5.1.0 Release 5) Retrieved from www.etsi.org.

*Primary Examiner*—Binh K. Tieu
(74) *Attorney, Agent, or Firm*—Squire, Sanders & Dempsey L.L.P.

(57) ABSTRACT

This invention relates to a SIP and SDP protocols. The idea of the invention is to modify SDP descriptions included in SIP messages to facilitate transcoding. After receiving an INVITE message from a calling party, the SIP proxy negotiates with a transcoder for getting a list of codecs of the transcoder and their address information. The SIP proxy adds the codec list of the transcoder to the received SDP description in the invite message, and sends this way modified SDP description in an INVITE message to a called party. After receiving the modified SDP, the called party selects codecs or a list of suitable codecs according to preferences in the modified SDP and its own preferences.

23 Claims, 4 Drawing Sheets

U.S. PATENT DOCUMENTS

2003/0229699 A1* 12/2003 Moran et al. ............... 709/227
2004/0047437 A1* 3/2004 Hamiti et al. ............... 375/326
2004/0076145 A1* 4/2004 Kauhanen et al. .......... 370/352

FOREIGN PATENT DOCUMENTS

WO    WO 02/15625 A1    2/2002
WO    WO 02/15627 A1    2/2002

* cited by examiner

TRANSCODING ARRANGEMENT IN A SESSION INITIATION

FIELD OF THE INVENTION

The invention relates to SIP (Session Initiation Protocol) and SDP (Session Description Protocol) protocols. SIP is used to establish multimedia sessions in IP networks, and SDP, which is carried in SIP messages, is used to describe and negotiate the characteristics of the session media (such as audio or video). The characteristics include e.g. the audio and video codecs to be used, and also their parameters.

BACKGROUND OF THE INVENTION

SIP is a signaling protocol that handles initiation, modification and termination of multimedia sessions among two or more parties. SIP is a protocol created by IETF (Internet Engineering Task Force) for facilitating multimedia sessions (such as voice calls) over IP networks. It is a part of the multimedia conference architecture of IETF.

SIP is a TCP/IP application layer protocol, in a same way as HTTP (Hypertext Transfer Protocol) and SMTP (Simple Mail Transfer Protocol). As other TCP/IP protocols, SIP is independent from the physical network structure SIP is used to initiate multimedia sessions, but the protocol itself does not describe the characteristics of the medias used within the session. That is done by another protocol, SDP, which SIP merely carries as payload. IETF SIP specifications define the conventions for SDP usage within SIP. In addition 3GPP (Third Generation Partnership Project) has specified own conventions for SDP usage in SIP, which currently differ somewhat from IETF. The main difference is that according to the IETF the negotiation always follows offer-answer model, where SDP is sent once for each direction, and the attributes can be unidirectional (i.e. e.g. different codecs in different directions). In 3GPP it is possible that a third SDP message in the direction of the first one (offer-answer-final offer) is sent, and attributes are usually bidirectional (i.e. e.g. the same codec in both directions a mandatory requirement).

The media attributes described and negotiated by SDP include media types (audio, video, text etc.), codecs and their characteristics and the transport addresses where media should be sent. For example audio and video are usually transmitted over RTP, and for that payload type number, UDP port number and IP address are needed. SIP/SDP messages usually traverse several proxy elements (IP hosts) for routing and service control purposes, while the media itself is send directly between the two communicating endpoints (IP hosts) whenever possible.

Figure 1:
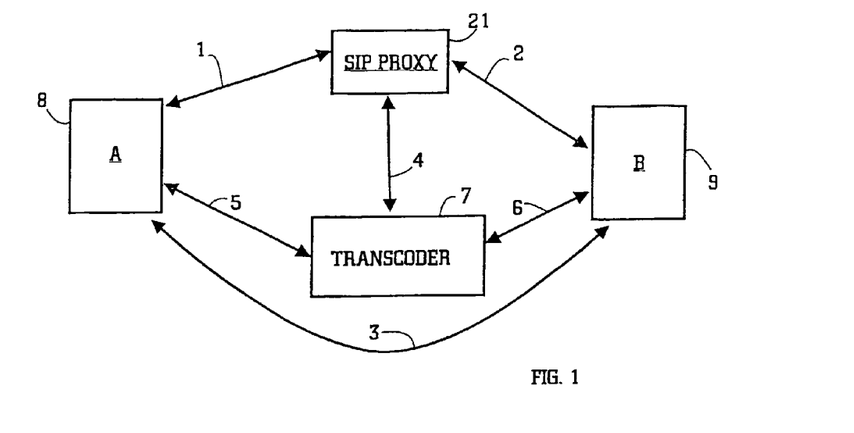
FIG. 1 illustrates a simplified example of a network architecture, describing signaling and payload streams among elements of the network.

FIG. 1 shows a simplified example of a network architecture, describing signaling (SIP/SDP) and media streams (RTP) among network elements. When subscriber A (8) wants to invite subscriber B (9) to create a session between them, the signaling (1) between A and B usually needs to traverse via at least one SIP proxy (21). The SIP proxy provides name resolution and user location among other things, and communicates (2) with subscriber B as well. After the necessary signaling information has been exchanged between A, B and the SIP proxy, a media (3) path can be created between A and B. The path carries one or more media streams (such as video, voice). Each stream is preferably composed of RTP packets. As the media streams are sent directly from A to B (and vice versa), A and B need to support a common codec for each media to be able to understand each other. SDP is used to negotiate theses capabilities.

However, if there is no common codec among the parties, transcoding of the streams is needed between A and B. The transcoding is performed by a transcoder (IP host) (7) somewhere in the network. A suitable codec has to be negotiated (4) between A and the transcoder, and between B and the transcoder. This also means that there is one RTP session (5) between A and the transcoder, and another RTP session (6) between B and the transcoder.

Figure 2:
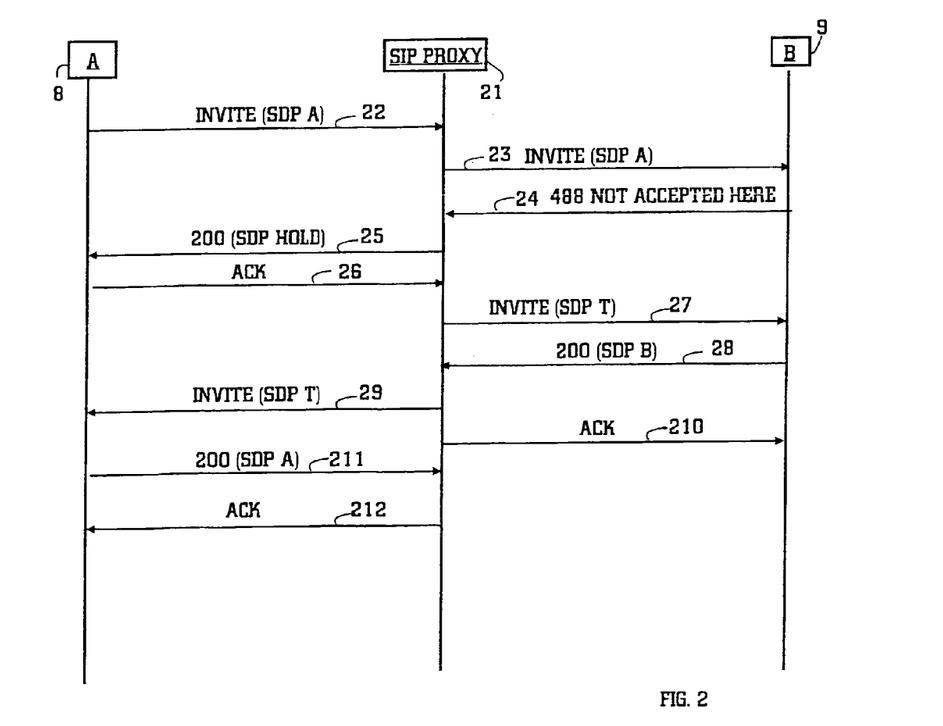
FIG. 2 shows an example of a known solution of assigning a transcoder between two parties.

FIG. 2 shows an example of a known solution of assigning a transcoder between two parties, A and B. The calling party A (8) sends an INVITE message (22) containing SDP toward the SIP proxy (21). SDP contains the list of the codecs supported by A for each media for this session. The SIP proxy forwards (23) INVITE with SDP unmodified toward the called party (B). If B does not support any of the codecs described in the SDP it receives, it generates an error response toward the SIP proxy (24). When the SIP proxy receives the error response, it knows that a transcoder is needed and starts the process. It can put A party on hold (25), and send a new INVITE with SDP (27) containing transcoder address and codecs toward B. Naturally, A acknowledges (26) the hold. If B answers with 200 OK (28), a new INVITE (29) can be sent toward A offering the transcoder address and codecs as well. Naturally, the SIP proxy acknowledges (210) the 200 OK message, and A sends a 200 (SDP A) message (211) to the SIP proxy, which acknowledges (212) it. As an end result, both A and B have media streams to transcoder negotiated, and both have a signaling relation to SIP proxy.

The problem of this solution is that it generates an additional signaling roundtrip (the error response (24), and a new INVITE (29)), which-causes additional delay to the call setup. Especially in a wireless network environment those kind of delays can be unacceptable. The goal of this invention is to eliminate this problem. This is achieved in a way described in the claims.

SUMMARY OF THE INVENTION

The invention is related to a situation where no common codec (or generally any required media feature) is supported by the two communicating endpoints, and thus a transcoder (or generally any translator function) needs to be assigned to the media path. The idea of the invention is to modify SDP messages in SIP proxy so that transcoder assignment becomes (practically) transparent to the endpoints. After receiving an INVITE message from a calling party, a SIP proxy negotiates with a transcoder for getting a list of codecs of the transcoder and their address information (this could have been done already in advance). The SIP proxy adds, i.e. inserts the codec list of the transcoder (only those codecs not already listed by the calling party) into the received SDP message (embedded in the INVITE message), and sends the extended SDP message in an INVITE message toward the called party. The added codecs are associated with the address of the transcoder instead of the calling party. After receiving the modified SDP, the called party selects codecs or a list of suitable codecs according to preferences in the modified SDP and its own preferences, and sends the selection of codecs back to the SIP proxy embedded in a suitable SIP response message. No error response is generated if the called party supports at least one of the codecs inserted either by the calling party OR the transcoder. For the called party there is in practice no difference between the codecs offered by the calling party or the transcoder, except that the former should be given higher preference.

When receiving the respose, the SIP proxy examines whether transcoding is needed or not (not needed if called party supports a codec supported by the calling party). If transcoding is not needed, the SIP proxy modifies the SDP message to look as a respose to the original SDP generated by the calling party. When the calling party receives the message it does not notice that the SIP proxy has done any alterations to SDP whatsoever. After that, session establishment and codec negotiation proceeds normally according to IETF and/or 3GPP specifications and the SIP proxy has no need to intervene in it anymore.

If transcoding is needed (called party did not list any of the codecs originally offered by the calling party), the SIP proxy modifies SDP message in such a way that it proposes codecs that the transcoder (and of course the calling party as well) supports. Those codecs are associated with the address of the transcoder. After this the session establishment and codec negotiation continue according to normal IETF and/or 3GPP specifications. The only difference is that there are actually two negotiations, one between the calling party and the SIP proxy, and another one between the SIP proxy and the called party. The situation is transparent to the endpoints, and no additional signaling compared to ordinary session setup is needed.

BRIEF DESCRIPTION OF THE DRAWINGS

In the following the invention is described in more detail by means of FIGS. 1-6 in the attached drawings where.

DETAILED DESCRIPTION OF THE INVENTION

Figure 3:
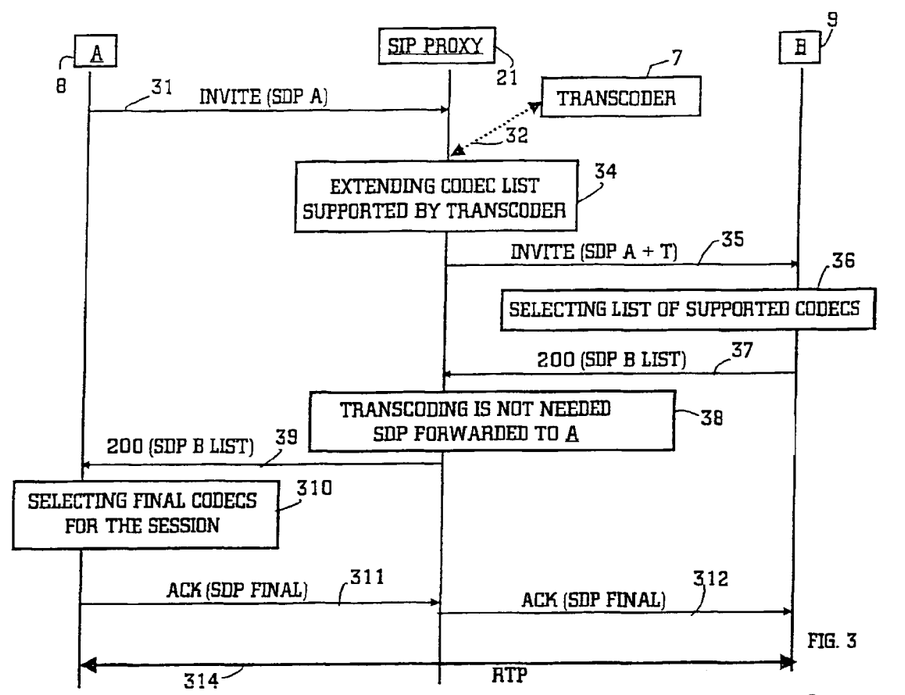
FIG. 3 illustrates an example of initiation signal information between a calling party and a SIP proxy, and between a called party and the SIP proxy according to the invention when transcoding is not needed and the calling party selects final codecs.

FIG. 3 shows an example of initiation signal information between a calling party (i.e an originating party element) and a SIP proxy (i.e. a third party element), and between the called party (i.e. a terminating party element), and the SIP proxy according to the invention when transcoding is not needed and the calling party selects final codecs, First, the calling party (8) sends an INVITE message INVITE(SDP A) (31) to the SIP proxy (21). The message contains SDP description A, which comprises information of the codecs of the calling party. Let the SDP be:

v=0
o=sender 123447798 123447798 IN IP4 128.17.34.2
t=0 0
c=IN IP4 111.111.111.11
m=audio 20000 RTP/AVP 0 8
a=fid:1
m=video 20001 RTP/AVP 98
a=rtpmap: 98 L16/16000/2
a=fid:1 where v describes a version of the SDP protocol, and o is the sender of the SDP message, containing the sender's username, session ID, a version number of this announcement, network type, address type, and address. The fields of letter t describe the start and stop times for a session; c describes connection data, comprising a network type, address type, and connection address. The fields of letter m describe, a media type, a transport port, transport protocol, and media format. The letter a means an attribute description for the session.

Let's look at descriptions c, m, and a closer. As mentioned, c describes a connection, in this case the Internet network using the IP4 protocol at the address 111.111.111.11. m describes media, for example audio at port 20000 using RTP audio-visual profile as a transport protocol, either a media format 0 or 8. The next a-rows after the m-row describe optional attributes of the media of m—for example fid:1 indicates to which logical session media m belongs. The rtpmap attribute is needed if a media format of m is dynamic—for example media format 98 is a dynamic type, which means that this type has to be defined to be a certain type of media format. For example, a=rtpmap: 98 L16/16000/2 means that media type 98 of m is 16 bit linear encoded stereo audio sampled at 16 kHz. So, media formats describe which codecs should be used.

After receiving SDP A the SIP proxy negotiates (32) with the transcoder (7) for getting a list of the transcodes codecs. The SIP proxy extends (34) SDP A with that list. Let the codecs of the transcoder, which are added to SDP A be:

c=IN IP4 111.112.222.11
m=audio 30000 RTP/AVP 10 11
a=fid:1
m=audio 30001 RTP/AVP 3
a=fid:1
m=video 30002 RTP/AVP 31
a=fid:1
m=video 30003 RTP/AVP 32
a=fid:1

It should be noticed that the connection address of the transcoder and the port numbers for the media formats should be given, as is the identification of the logical session as well. Hence, for the given example, the SDP is:

v=0
o=sender 123447798 123447798 IN IP4 128.17.34.2
t=0 0
c=IN IP4 111.111.111.11
m=audio 20000 RTP/AVP 0 8
a=fid:1
m=video 20001 RTP/AVP 98
a=rtpmap: 98 L16/16000/2
a=fid:1
v=0 o=transcoder 123447799 123447799 IN IP4 128.18.35.15
t=0 0
c=IN IP4 111.112.222.11
m=audio 30000 RTP/AVP 10 11
a=fid:1
m=audio 30001 RTP/AVP 3
a=fid:1
m=video 30002 RTP/AVP 31
a=fid:1
m=video 30003 RTP/AVP 32
a=fid:1

It should be also noticed that if both the transcoder and the calling party support certain common codecs, these common codecs are not needed to be added to SDP A. The transcoder and the proxy anyway store those codecs in case, later on in the session initiation sequence, transcoding is needed.

The SIP proxy sends (35) the modified SDP description (SDP A+T) in the INVITE message to the called party (9), which selects (36) a list of suitable codecs according to preferences of SDP A+T and its own preferences. After this the called party sends (37) its own list in a SDP description (SDP B list) in a 200 message to the SIP proxy. Let this SDP description be:
v=0
o=receiver 123446655 123446655 IN IP4 128.12.30.4
t=0 0
c=IN IP4 222.222.222.22
m=audio 40000 RTP/AVP 0
a=fid:1
m=audio 40001 RTP/AVP 8
a=fid:1
m=video 40004 RTP/AVP 98
a=rtpmap: 98 L16/16000/2
a=fid:1
m=video 40005 RTP/AVP 31
a=fid:1

The SIP proxy examines (38) the message from the called party, and in this case the result of the examination is that transcoding is not needed—both the calling and called party support certain common codecs. In this case the media formats 0, 8, and 98. The SDP description, which is sent (39) to the calling party, contains the information of the common codecs—the media formats 0, 8, and the common dynamic type 98.

The calling party selects (310) final codecs. In this case, the calling party may select either audio format 0 or 8—let's say that the selection is 0. Actually, there is no need to select a video format, since there is only one common format, but if there were more than one common codec, the selection should be made. A final SDP description containing the selected codecs with connection and port addresses information is sent (311) as an acknowledgement message to the SIP proxy, which simply forwards (312) it to the called party. RTP streams (314) can be established between the calling and called party.

It is worth mentioning that there can be more than one media format, which can be selected for a media type, but one should always be selected. For example audio formats 0 and 8 can both be selected for forming audio streams, but only one stream is used at a time per media type.

Figure 4:
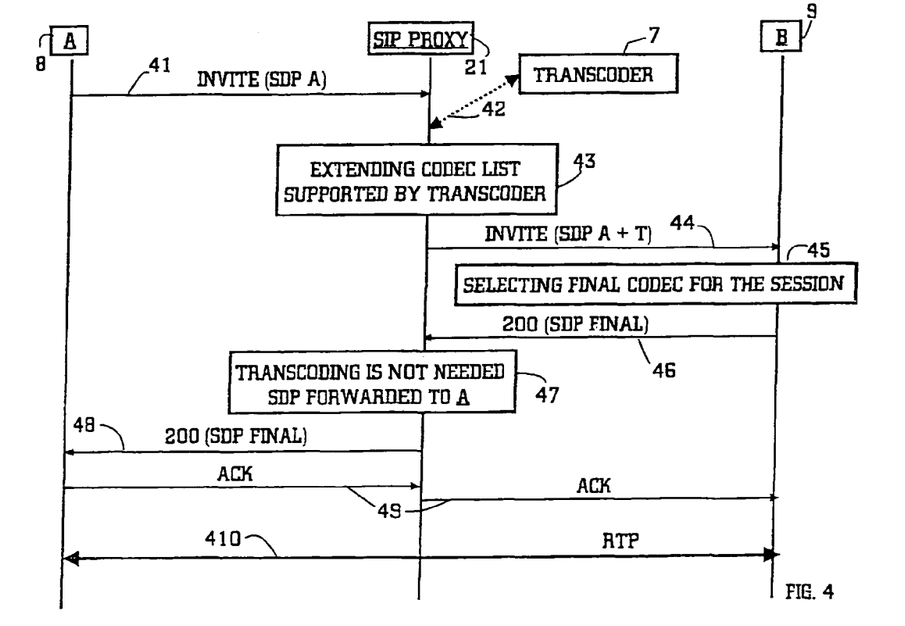
FIG. 4 illustrates an example of initiation signal information between a calling party and a SIP proxy, and between a called party and the SIP proxy according to the invention when transcoding is not needed and the called party selects final codecs.

FIG. 4 shows an example of initiation signal information between a calling party and a SIP proxy, and between a called party and the SIP proxy according to the invention when transcoding is not needed and the called party selects final codecs, First, the calling party (8) sends an INVITE message INVITE(SDP A) (41) to the SIP proxy (21). The message contains SDP description A, which comprises information of the codecs of the calling party. Let the SDP be the same as in the example illustrated in FIG. 3.

After receiving SDP A the SIP proxy negotiate (42) with the transcoder (7) for getting a list of transcoder's codecs. The SIP proxy extends (43) SDP A with that list. Let the codecs of the transcoder, which are added to SDP A be the same as in the example illustrated in FIG. 3.

The SIP proxy sends (44) the modified SDP description SDP A+T in the INVITE message to the called party (9), which selects (45) suitable codecs according to the preferences of SDP A+T and its own preferences. After this the called party sends (46) its own list in an SDP description to the SIP proxy. Let this SDP description to be:
v=0
o=receiver 123446655 123446655 IN IP4 128.12.30.4
t=0 0
c=IN IP4 222.222.222.22
m=audio 40000 RTP/AVP 8
a=fid:1
m=video 40004 RTP/AVP 98
a=rtpmap: 98 L16/16000/2
a=fid:1

The SIP proxy examines (47) the message from the called party, and in this case the result of the examination is that transcoding is not needed—both the calling and called party support certain common codecs. In this case the media formats 8 and common dynamic type 98. The SDP description, which is sent (48) to the calling party, contains the information of these common and final codecs. After receiving the final SDP information, the calling party sends an acknowledge message back (49) to the SIP proxy, which forwards it to the called party. RTP streams (410) can be established between the calling and called party.

Figure 5:
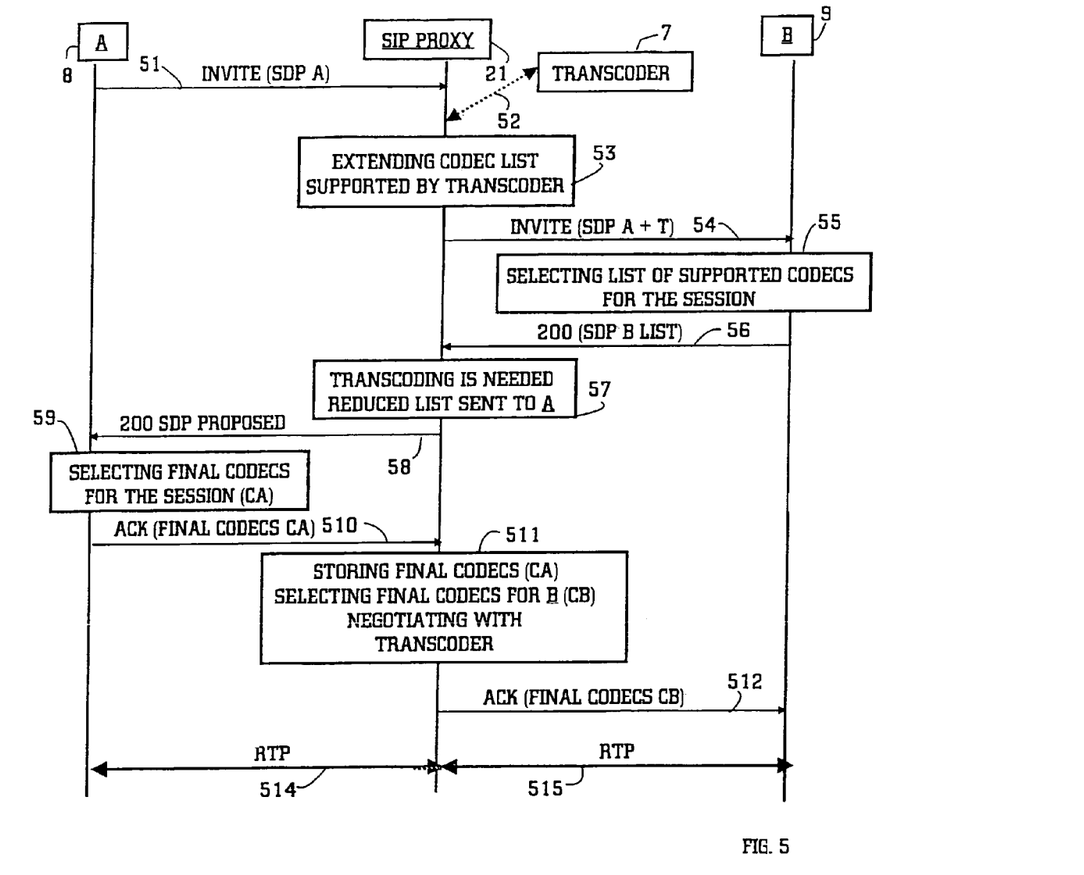
FIG. 5 illustrates an example of initiation signal information between a calling party and a SIP proxy, and between a called party and the SIP proxy according to the invention when transcoding is needed and the calling party selects final codecs for it, and the SIP proxy selects final codecs for the called party.

FIG. 5 shows an example of initiation signal information between a calling party and a SIP proxy, and between a called party and the SIP proxy according to the invention when transcoding is needed and the calling party selects final codecs for the sessions between it and the SIP proxy, First, the calling party (8) sends an INVITE message INVITE(SDP A) (51) to the SIP proxy (21). The message contains SDP description A, which comprises information of the codecs of the calling party. Let the SDP be the same as in the example illustrated in FIG. 3.

After receiving SDP A the SIP proxy negotiates (52) with the transcoder (7) for getting a list of the transcoder's codecs. The SIP proxy extends (53) SDP A with that list. Let the codecs of the transcoder, which are added to SDP A be the same as in the example illustrated in FIG. 3.

The SIP proxy sends (54) the modified SDP description SDP A+T in the INVITE message to the called party (9), which selects (55) a suitable list of codecs according to preferences of SDP A+T and its own preferences. After this the called party sends (56) its own list in an SDP description (in the 200 message) to the SIP proxy. Let this SDP description to be:
v=0
o=receiver 123446655 123446655 IN IP4 128.12.30.4
t=0 0
c=IN IP4 222.222.222.22
m=audio 40000 RTP/AVP 3
a=fid:1
m=audio 40001 RTP/AVP 10
a=fid:1
m=video 40004 RTP/AVP 32
a=fid:1
m=video 40005 RTP/AVP 31
a=fid:1

The SIP proxy examines (57) the message from the called party; and in this case the result of the examination is that transcoding is needed. The SIP proxy notices that the streams using the codecs of the calling party must be directed to the transcoder—instead of the called party, and the streams using the codecs of the called party must be directed to the transcoder as well. The transcoder will perform the transformation between the codecs of the calling party and the called party during the session. So, instead of the codec information of the called party, the SIP proxy sends (58) an SDP description with the codec information of the transcoder, knowing already the codec supported by the calling party.

The calling party selects (59) final codecs for the session between it and the transcoder. Let's assume that the transcoder supports all media formats of the calling party, so the calling party may select either audio format 0 or 8—let's say that the selection is 8 (if only one audio format type is desired). Actually, there is no need to select a video format, since there is only one common format, but if there were more than one codec, the selection should be made.

A final SDP description for the session between the calling party and the transcoder, containing the selected-codecs with connection and port addresses information is sent (510) in an acknowledgement message to the SIP proxy, which makes storing actions of these codecs (including reserving the codecs in the transcoder), negotiating with the transcoder (511). The SIP proxy also selects the final codecs—let's say media formats 10 and 31—for the session between the called party and the transcoder, negotiating with the transcoder. The SIP proxy sends (512) the acknowledgement containing SDP description with this final codec information to the called party.

RTP streams can be established between the calling party and the transcoder (514), and between the called party and the transcoder (515).

Figure 6:
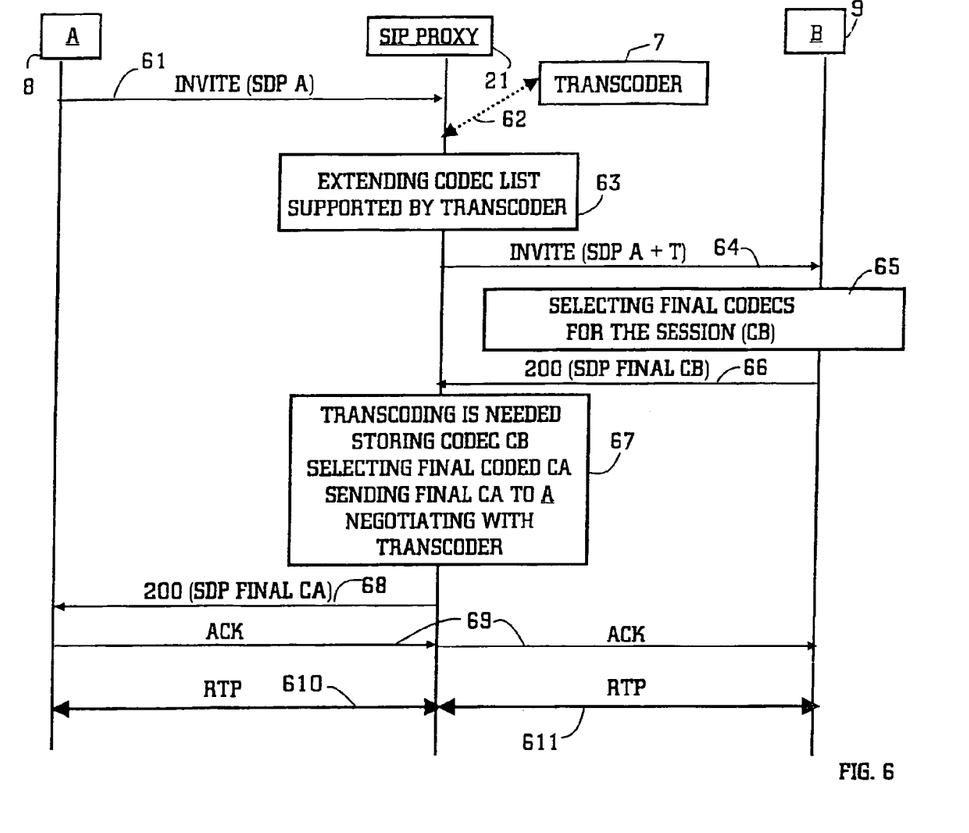
FIG. 6 illustrates an example of initiation signal information between a calling party and a SIP proxy, and between a called party and the SIP proxy according to the invention when transcoding is needed and the called party selects final codecs for it, and the SIP proxy selects final codecs for the calling party.

FIG. 6 shows an example of initiation signal information between a calling party and a SIP proxy, and between a called party and the SIP proxy according to the invention when transcoding is needed and the called party selects final codecs for the sessions between it and the SIP proxy. First, the calling party (8) sends an INVITE message INVITE (SDP A) (61) to the SIP proxy (21). The message contains SDP description A, which comprises information of the codecs of the calling party. Let the SDP be the same as in the example illustrated in FIG. 3.

After receiving SDP A the SIP proxy negotiates (62) with the transcoder (7) for getting a list of the transcoder's codecs. The SIP proxy extends (63) SDP A with that list. Let the codecs of the transcoder, which are added to SDP A be the same as in the example illustrated in FIG. 3.

The SIP proxy sends (64) the modified SDP description SDP A+T in the INVITE message to the called party (9), which selects (65) final codecs according to preferences of SDP A+T and its own preferences. After this the called party sends (66) its own list in an SDP description in a 200 message to the SIP proxy. Let this SDP description to be:

v=0
o=receiver 123446655 123446655 IN IP4 128.12.30.4
t=0 0
c=IN IP4 222.222.222.22
m=audio 40001 RTP/AVP 10
a=fid:1
m=video 40005 RTPIAVP 31
a=fid:1

The SIP proxy examines (67) the message from the called party, and in this case the result of the examination is that transcoding is needed. The SIP proxy notices that the streams using the codecs of the calling party must be directed to the transcoder—instead of the called party, and the streams using the codecs of the called party must be directed to the transcoder as well. The transcoder makes a transformation between the codecs of the calling party and the called party.

Since the called party has already selected final codecs—media formats 10 and 31—for the session between it and the transcoder, the SIP proxy makes storing actions of these codecs, negotiating with the transcoder (67). The SIP proxy also selects the final codecs—let's say media formats 8 and dynamic type 98—for the session between the calling party and the transcoder, negotiating with the transcoder. The SIP proxy sends (68) an. SDP description with this final codec information in the 200 message to the called party.

After receiving the final SDP information, the calling party sends an acknowledge message back (69) to the SIP proxy, which forwards it to the calling party. RTP streams can be established between the calling party and the transcoder (610), and between the called party and the transcoder (611).

FIGS. 3 to 6 also illustrate the inventive method. The codec list of the calling party is extended by the codec list of the transcoder (not with the common codecs to the calling party and transcoder). This way a modified (extended) codec list is sent to the called party. The called party selects at least one final codec or a list of suitable codecs. The codec selection of the called party is sent back to the SIP proxy, which examines whether transcoding is needed or not. The SIP proxy also performs other, possibly needed, actions in this phase. As a response to the examination, the SIP proxy sends a suitable SDP description to the calling party. If needed, the calling party makes a selection of at least one final codec, and sends a final SDP description back to the SIP proxy (otherwise the calling party acknowledges the received codecs). As a response to this final SDP description the SIP proxy performs necessary actions, such as sending a final SDP description to the called party. The inventive method is performed by the means of inventive arrangement.

As can be seen from FIGS. 3 to 6, the invention supports both 2-way and 3-way codec negotiation. FIGS. 3 and 5 show examples of 3-way negotiations, i.e. SDP descriptions are sent between parties (and a SIP proxy) 3 times. FIGS. 4 and 6 shows examples of 2-way negotiations, i.e. SDP descriptions are sent between parties (and a SIP proxy) 2 times. So, the inventive arrangement supports different terminal types.

As a conclusion for the support of different terminals, the invention makes it possible to use 3G terminals as well. It should be mentioned that although the examples above use basic SIP methods for transporting messages, being SDP a payload inside a SIP message, the messages can also be transported by using other methods, such as a PRACK method that is more compatible in many 3G cases. Also the description protocol does not have to be SDP, but it can be another suitable protocol.

The invention also makes it possible to run a SIP proxy with less processing power. When a known SIP proxy works like a UAS (User Agent Server) to the calling party of a session and UAC (User Agent Client) to the called party, the inventive SIP proxy works more like an intermediator—not like a terminating end (UAS) or originating end (UAC). The intermediator needs less resource in the state-machine of the SIP proxy than an implementation using agents. The intermediator function can be achieved according to the invention when the first SDP message from the SIP proxy to the called party is modified—offering the called party (and the SIP proxy as well) two counterpart addresses for initiating the logical session between the calling and called party.

As can be seen, the invention can be implemented in many ways. Although, session initiation signals are described in this context using SIP and SDP, it is clear that other protocols can be used. The invention can also be used in multicast solutions. Instead of a SIP proxy as a third party element, a CSCF (Call State Control Function) element can be used. Thus, it is evident that the invention is not restricted to the solutions described in this text, but the invention can be used in other solutions as well, in the scope of the inventive idea.

The invention claimed is:

1. A method for initiating a communication session between an originating and a terminating party in which description messages are sent between the parties via a third party, the initiating method comprising:
   receiving at the third party an invitation description message comprising a list of communication equipment supported by the originating party,
   modifying at the third party the invitation description message by adding to the list communication equipment supported by translation circuitry that negotiates with the third party;
   selecting at the terminating party at least one of the communication equipment in the modified message which is sent in a further description message to the third party; and
   identifying at the third party from said selection whether the translation circuitry is needed for establishing said communication session between the originating and terminating parties.

2. A method according to claim 1, wherein said selecting at the terminating party is carried out according to the preferences of the modified invitation description message and the preferences of the terminating party.

3. A method according to claim 1, wherein if the translation circuitry is not needed, the method further comprises:
   sending a description message to the originating party with the proposals of communication equipment common to both the originating and terminating party;
   choosing at the originating party from the proposals which of the common communication equipment is to be used in the established communication session; and
   acknowledging said choice by sending a final description message from the originating party to the third party which is forwarded to the terminating party.

4. A method according to claim 1, wherein if the translation circuitry is needed, the method further comprises:
   sending by the third party, a description message to the originating party with proposals of communication equipment supported by the translation circuitry;
   receiving by the third party, an acknowledgement description message from the originating party with a final choice as to which communication equipment is to be used for the established communication session between the originating party and the translation circuitry; and
   storing by the third party, the final choice of communication equipment to be used between the originating party and the translation circuitry in the established communication session;
   choosing, by the third party, from the description message sent during the selecting step, the final communication equipment to be used between the translation circuitry and the terminating party in the established communication session and forwarding said final choice to the terminating party in a final acknowledgement message.

5. A method according to claim 1, wherein said terminating party is capable of selecting a plurality of suitable communication equipment in the modified message.

6. A method according to claim 1, wherein said selecting at the terminating party comprises making a final choice as to which communication equipment is to be used for the established communication session between the translation circuitry and the terminating party.

7. A method according to claim 6, wherein if the translation circuitry is not needed, the method further comprises:
   sending said chosen communication equipment in a further description message to the originating party; and
   acknowledging said choice by sending a final description message from the originating party to the third party which is forwarded to the terminating party.

8. A method according to claim 6, wherein if the translation circuitry is needed the method further comprises:
   storing, at the third party, said chosen communication equipment for the established communication session between the translation circuitry and the terminating party;
   choosing, by the third party, which communication equipment is to be used for the established communication session between the originating party and the translation circuitry and sending said choice to the originating party;
   receiving, by the third party, an acknowledgement description message from the originating party and forwarding said acknowledgement message to the terminating party.

9. A method according to claim 1, wherein the communication equipment is a codec.

10. A method according to claim 1, wherein the translation circuitry is a transcoder.

11. A method according to claim 1, wherein said established communication session is comprised of real time protocol (RTP) streams between the originating and terminating parties.

12. A method according to claim 1, wherein said initiating communication session is performed by a signalling protocol.

13. A method according to claim 1, wherein said initiating communication session is performed by a session initiation protocol (SIP) and wherein said description messages use a session description protocol (SDP).

14. A method according to claim 1, wherein said third party is a SIP proxy server.

15. A method according to claim 1, wherein said third party is a call state control function (CSCF) element.

16. A method according to claim 1, wherein the third party negotiates with the communication translation circuitry and is able to reserve communication equipment of said translation circuitry for use during the established communication session.

17. A communication system for initiating a communication session between an originating and a terminating party, the system comprising:
   means for sending at the originating party an invitation description message to a third party comprising a list of communication equipment supported by the originating party;
   means for modifying at the third party the invitation description message by adding to the list communication equipment supported by a translation circuit that is able to negotiate with the third party;

means for selecting at the terminating party at least one of the communication equipment in the modified message, the selection being sent in a further description message to the third party; and means for identifying at the third party from said selection whether the translation circuitry is needed for establishing a communication session between the originating and terminating parties.

18. An originating device for communicating with a terminating device, the devices communicating via a third device in an initiating communication session, the originating device comprising:

communication equipment configured to transfer data during an established communication session;

circuitry configured to send an invitation description message to the third device comprising a list of the communication equipment supported by the originating party, wherein the invitation description message is modified by the third device by adding to the list communication equipment supported by a translation device that negotiates with the third device, wherein said terminating device selects at least one of the communication equipment in the modified message which is sent in a further description message to the third device for identifying from said selection whether the translation device is needed for an established communication session between the originating and terminating devices;

circuitry configured to receive a list of communication equipment supported by the other devices; and circuitry configured to send acknowledgement messages.

19. The originating device of claim 18, comprising circuitry configured to make the final choice of communication equipment to be used in the established communication session between the originating device and the translation device.

20. A third party device located between an originating device and a terminating device for use in initiating a communication session, the third party device comprising:

circuitry configured to negotiate with translation circuitry having communication equipment;

circuitry configured to receive from the originating device an invitation description message comprising a list of communication equipment supported by the originating device;

circuitry configured to modify the invitation description message by adding to the list, communication equipment supported by the translation circuitry;

circuitry configured to send said modified message to the terminating device which selects at least one communication equipment in the modified message;

circuitry configured to receive said selection; and circuitry configured to identify from said selection whether the translation circuitry is needed for establishing a communication session between the originating and terminating devices.

21. A terminating device for communicating with an originating device in an established communication session, the devices communicating in an initiating communication session via a third device, the terminating device comprising:

communication equipment configured to transfer data during an established communication session;

circuitry configured to receive a modified invitation description message from the third device comprising a list of the communication equipment supported by the originating party and which has been modified by adding to the list communication equipment supported by a translation device that negotiates with the third device;

circuitry configured to select at least one of the communication equipment in the modified message;

circuitry configured to send said selection in a further description message to the third device for identifying from said selection whether the translation device is needed for establishing said communication session between the originating and terminating parties; and circuitry configured to receive acknowledgement messages.

22. The terminating device of claim 21, wherein the circuitry configured to receive acknowledgement messages comprises circuitry configured to receive the final choice of communication equipment to be used in the established communication session between the translation device and the terminating device.

23. The terminating device of claim 21, wherein the circuitry configured to select is able to make a final choice of communication equipment to be used in the established communication session between the translation device and the terminating device.

* * * * *